Patented Oct. 26, 1954

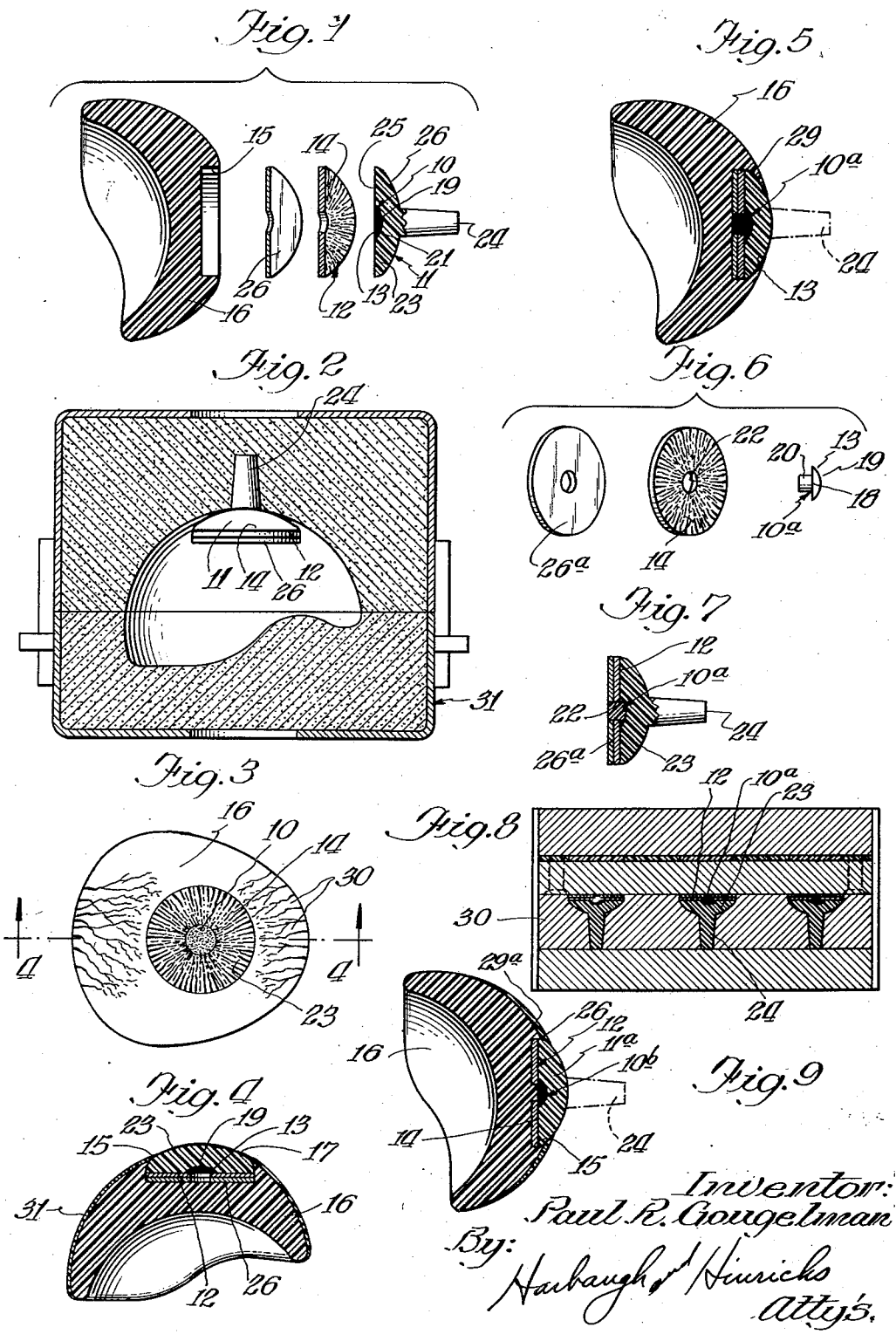

2,692,391

UNITED STATES PATENT OFFICE 2,692,391

ARTIFICIAL EYE

Paul R. Gougelman, Wilmette, Ill., assignor to Mager & Gougelman, Inc., Chicago, Ill., a corporation of Illinois Application April 7, 1951, Serial No. 219,831

9 Claims. (Cl. 3—13)

This invention relates to artificial eyes made of plastics such as methyl methacrylate and more particularly to the article and the method by which prosthetic devices perform to accomplish a matching appearance of a natural eye.

If a person can detect a difference between a person's eyes, the conclusion is immediate that one is artificial and it makes no difference which one is the artificial one, the purpose of having an artificial eye is largely lost both from a physical as well as a psychological viewpoint.

The problem is not so much one of matching colors as it is one of having an artificial eye look like the natural eye after color matching has been accomplished. There is a depth of black to the pupil which must be attained and a marginal appearance to the iris which is soft and well blended before the natural eye appeal is approached. There must be a sense to the observer of a depth beyond the iris from which a wearer is looking rather than the feeling that the iris itself is the thing from which the wearer is looking.

In the present invention I provide a pupillary member of a highly polished black convex surface preferably made of a plastic adapted for use in forming artificial eyes. For example, such a plastic would include methyl methacrylate resins used for this purpose, such a resin being sold under the name of "lucite." Consequently there is no surface upon which light can collect. Not only is light immediately reflected away from the surface but the convexity of the surface specularly reflects the reflected light along diverging paths to an infinitesmal amount compared with that which might otherwise be seen by an observer looking at the pupillary member. But even this slight amount of light disappears to an observer when the pupillary member is embedded in a crystal clear cornea member of the same basic material. The light or image reflection from the corneal member is all that is seen and this is seen as a high light as far as light reflection is concerned, yet the iris colors appear to be lighted from within the corneal member the same as a natural eye.

The invention is further characterized by the iris member being located at the natural depth in the eye behind the cornea with the marginal edges of the iris covered by a marginally thinning or blending of the sclera portion at the limbus which also serves to conduct and reflect light to and upon the iris to give it a natural brilliance.

A further object of the invention is to provide a natural appearing pupil wherein light reflective surfaces are compoundly curved to specularly reflect along diverging paths the light which might be reflected from it.

Another object of the invention is to provide a corneal assembly which is easy to make and readily handled to accomplish exact alignment of all parts and the correct positioning in the eye assembly for both the custom and quantity production of artificial eyes.

Another object of the invention is to provide a construction which can be completed and fitted at one appointment with a patient, or the eye can be completed in less than a day at a laboratory.

The invention also contemplates an arrangement wherein iris or corneal members may be standardized and inventoried economically, yet the eyes can be made up with different pupillary diameters.

A further object of the invention is to provide a simple, inexpensive article and method of producing an artificial eye of plastics such as methyl methacrylate for a particular patient or for a bank or stock from which components may be selected and prepared for general distribution and selection.

These being among the objects, other and further objects and advantages will become apparent to those skilled in the art from the drawings and description relating thereto.

Referring now to the drawing:

Fig. 1 is a sectional exploded view of an artificial eye embodying the preferred form of the invention taken on the theoretical line of vision as the center line of the eye.

Fig. 2 is a sectional view from the side showing the mold and the corneal assembly ready for receiving the sclera of the eye.

Fig. 3 is a front view of the finished artificial eye.

Fig. 4 is a sectional view of the finished eye taken on line 4—4 of Fig. 3.

Fig. 5 is a sectional view of another embodiment of the invention.

Fig. 6 is an exploded view of the iris-pupillary assembly present in the embodiment shown in Fig. 5.

Fig. 7 is a sectional view of the cornea-pupil-iris assembly ready for investing and casting in a sclera body.

Fig. 8 is a section of the mold used to produce the assembly shown in Fig. 7.

Fig. 9 is a sectional view of an artificial eye embodying another form of the invention.

My invention contemplates a convexly shaped pupillary member or button 10, 10a or 10b embedded in a recess in the back of a corneal member 11 as superposed on and in front of an iris disk 12 having the colors thereon with the periphery of the pupillary concavity or button tapered to a marginal edge 13 that rests against the face 14 of the iris disk. These elements are embedded in a recess 15 on the front of a sclera member 16 to a depth bringing the face of the iris disk slightly below the mouth of the recess with a blend at the limbus overlapping the peripheral edge of the iris disk. The assembly is covered with a conjunctiva coating 17 of crystal clear material.

In practicing my invention I prefer to fabricate the eyes from polymerized plastic and plastic monomer of methyl methacrylate in such fashion that the finished eyes are subjected to heat and pressure to completely polymerize all of the plastic material and produce a substantially homogeneous body. In the following description I have used the term monomer to designate a viscous fluid which is essentially monomer which has been partially polymerized to reduce its fluidity and a volatile solvent. The term polymer refers to solid material which is substantially completely polymerized.

The pupillary member can be made in one of three ways but preferably comprises a black methyl methocrylate resin or material. As shown at 10 or 10a it may be a preformed unit, or as shown at 10 and 10b it may be a monomer mastic or monomer paint. The material is convexly rounded on its outer face 19 to a thin marginal edge 13. One way of making the button 10 or 10a is to preform it to the shapes shown as by casting a segmented spherical form 10 or a short shanked rivet 10a. The conversely curved portion or head 18 is highly polished and the shank 20, when present, is of any desired length that may be needed to engage and line up in centered relationship the assembled elements as more fully described a little later.

The other way to make the button is to cut or cast a polished concave recess 21 in the back face 25 of the corneal member 11 to receive the above mentioned black plastic material therein either as a mastic or as a paint, and if a mastic it also can be cast against the back face of the corneal member. In any event the outer surface of the pupillary member is convex and extends into the corneal member.

Although the results attained and the performance of the articles made in these various forms is substantially the same as herein described, there are certain advantages present with each form. As already mentioned, the rivet shaped member 10a has certain alignment advantages and can be provided with a different sized heads. The element 10 without the shank, either as a preformed member bonded in place or a mastic, such makes it possible to use a solid iris disk behind it. Moreover, with the button 10 in place on the corneal member it is possible to machine or polish off the back side of the corneal member to any depth desired so that the pupillary diameter can be easily and infinitely determined.

The iris disk 12 is a circular member and although it can be molded, it preferably is made from a sheet of plastic material and can be made with or without an aperture 22 in the center of it. Upon the front face 14, non-fading pigmented coloring materials mixed in a monomer of methyl methacrylate and polymer mixture are brushed on layer after layer with the brush lines 23 radiating from the center to reproduce the structure and coloring of the natural eye to be matched. The thickness of the layer of coloring is not too critical when not overdone but should be thick enough that the brush lines are a part of the iris design and represent without undue obviousness the surface contours of the sphincter muscle of the eye which makes up the iris.

In those intsances where the disk is provided with an aperture, the aperture serves as a centering guide for the brush marks and coloring and also to receive the shank 20 of the pupillary member 10 in a precisely centered relationship. In both instances, however, the aperture is small enough that the edges 13 of the pupillary button overlap the innermost extremities of the brush lines to cover the rough starting edges of the brush strokes on the iris member at the center.

The corneal member 11 is preferably made of crystal clear methyl methacrylate resins, and has a main body 23 and a stem 24 extending therefrom for convenience in handling and in processing the eye. The rear face 25 of the body is flat while the front face 26 is spherical in contour. The corneal member 11 shown in Fig. 1 is a preformed element to become a part of an assembly along with other elements, whereas in the embodiment shown in Fig. 7, the corneal member 11a is formed and cast integrally with the pupillary button and iris disk as shown in Fig. 8 at the time the assembly is made.

Referring to Fig. 1, although the corneal member 11 can be molded to the shape shown with a rounded recess 21 in its rear face it preferably begins as a blank which is chucked in a collet lathe by the stem 24 and the body 23 turned to a true concentricity at its edges, and, while so held, it is also cut at the center to provide the recess 21. The recess can be made slightly wider than the largest expected pupillary diameter of any standard size. Then, preferably by monomer bond or monomer mastic or monomer paint, a quantity of black plastic or paint of the same material as the corneal member, is disposed in the recess. Thereafter the back face can be turned down or sanded off until the desired diameter of the pupillary member is reached. The use of a monomer of the plastic greatly shortens the overall production time because of its fast drying characteristics prior to ultimate polymerization of entire assembly.

Then the iris disk having the monomer coloring on its front face is coated with a clear monomer and pressed into place on the back of the corneal member with or without a backing plate 26 and let dry. The assembly is ready for use with a wax impression or for directly casting into a conventionally preformed sclera blank 16 as later described. The body of the member 12 can be peeled from the coloring after the coloring has been bonded if it is desired not to have any material in the eye other than methyl methacrylate resins.

With the embodiment shown in Fig. 6 the iris disk receives the pupillary button in the aperture 22 and the two, preferably with a backing plate 26a present, are disposed in a mold 30 (Fig. 8) and clear methyl methacrylate resins is cast against the front face of the iris disk and the pupillary members to provide a structure such as shown in Fig. 7, also to be used with a wax impression or directly with a conventional sclera blank with or without a backing plate 26a.

In fitting an artificial eye, either a body of wax is carved or sculptured to fit the orbital cavity, or a standard plastic form is fitted as by adding wax or buffing away material. The corneal assembly of either Fig. 1 or Fig. 7 is mounted in the body in correct position either during the initial fitting or after the body is fitted and marked where the line of vision is to come.

Another way of fitting an eye is to take the stock eyeball which fits the orbital cavity, mark the center line of vision and cut the recess 15 in it to receive the corneal assembly therein as secured by a monomer bond. With either fitting, wax is flowed into place at the limbus to cover the edge of the corneal assembly as shown at 29 in Fig. 5 or 29a in Fig. 9.

After the correct position of the corneal assembly is finally determined, the wax model with the corneal assembly is invested in a two part casting frame 31 as shown in Fig. 2 with the stem extending as shown so that the parting line accommodates all draws. The wax impression is removed either physically or by heat and the corneal assembly located in place, as shown in Fig. 2. A translucent plastic of the shade of white matching the natural eyeball is compressed under heat and pressure to polymerize and embed the corneal assembly therein. The artificial eye is then removed from the mold and the eye polished down at the limbus, until the desired blend of the translucent material is attained over the margins of the iris.

Thereafter the front surface of the sclera is coated with a monomer bond and red fibers of cotton or plastic monofilaments 30 are dropped in place to represent sclera veins. The adhesive is dried and the eye again returned to the mold as located in proper place by the stem 24 and the material that was ground away is replaced under compression and heat with a clear coating of methyl methacrylate resins 31 similar to the conjunctiva of the natural eye to protect the fibers and give a crystal appearance to the eye with a bright reflecting outer surface the same as a natural eye.

The artificial eye thus produced is of superior quality and exceptional appearance. The pupil appears completely natural and the iris margins have a soft appearance.

Furthermore, in all the embodiments described, the performance is the same. The bonding of the pupillary member and corneal member of the same material or of materials having approximately the same index of refraction leaves no reflective interface and light entering the corneal body is either absorbed by the convexly curved black pupillary member or is reflected back against the inner face of the corneal member to further illuminate the iris and give to it a lively brilliant appearance. Moreover, the use of a paint of the same material for coloring the iris and bonding the iris in place assists this brilliance and also reduces the time for making an artificial eye so that the eye can be fitted, made and delivered at one appointment with the patient, whereas heretofore repeated calls on different days have been required.

Moreover, movement of the eye operates to give the appearance of a pupil varying in size and also moves the observed pupil position laterally to provide a wider range within which observers have a feeling that the artificial eye is looking directly at them.

In some respects I am not able to account fully for the improved results which are obtained by the arrangement described, and it should be understood that any attempt to analyze the theory or theories which are believed to be responsible for these results is not to be construed as defining a mode of operation other than as claimed hereinafter but merely as a possible explanation of certain physical phenomena which have been observed.

Consequently, although certain embodiments have been shown and described herein it will be apparent to those skilled in the art that various uses, modifications and changes may be made without departing from the spirit and substance of the invention, the scope of which is commensurate with the appended claims.

What is claimed is:

1. In an artificial eye a pupillary member made of a black polymerized plastic material and having a convex front face and a rearwardly extending shank, a transparent corneal member having a recess on its back wall accommodating the convex front face of said pupillary member therein with the marginal edges of the pupil tapering to the edges of the recess, an iris element of plastic covering said back wall and overlapping the marginal edges of the pupillary member, said element including coloring in and a positioning opening in the center thereof receiving said shank, said plastic being polymerized to integrate said corneal member and coloring as a unitary body.

2. In an artificial eye of methyl methacrylate a pupillary member having a black curved front face, a transparent corneal member having a front face rounded to the edge of a substantially flat back wall and receiving in bonded relationship said pupillary member in a concave recess in the back wall thereof, an iris element having a hole in the center thereof and coloring materials mixed in methyl methacrylate brushed on the front face thereof with the brush lines radiating from the hole, said iris element being coplanar with the margins of the pupillary member and covering said back wall coextensively with said back wall and having said coloring materials bonded to said corneal member around said pupillary member by methyl methacrylate polymerized to integrate said members and element as a unitary body.

3. In an artificial eye a pupillary member having a highly polished black curved front face tapering marginally in a radial direction to a flat back face, a transparent corneal member bonded to said pupillary member with the pupillary member embedded in the back wall of the corneal member with said face and wall coplanar with each other, a flat iris disk having iris coloring on its front face and bonded to said coplanar back wall and back face of the pupillary member, said iris disk having an aperture at the center thereof with streaks of coloring materials on the front face thereof radiating from said aperture.

4. For use in an artificial eye a polymerized corneal member comprising a transparent corneal element of clear resin having a round concave recess in the rear wall tapering in depth at its edges to the face of the rear wall and a stem on the front wall coaxial with said recess, pupillary means including a black material of the same resin polymerized integrally with said corneal element in said recess and having a rearwardly extending shank, and means covering said back wall and pupillary member including a disk having a central opening received on said shank in guided relationship and a color design representing the color of an iris made of superposed colors in a carrier of said resin.

5. The combination called for in claim 3 in which said aperture in the iris disk is of a size less than that of the pupillary member.

6. An artifiicial eye in which the combination called for in claim 3 is located in a recess in the front face of an artificial eye body of translucent material having an inwardly thinning portion overlapping the margins of the corneal member at the limbus and the marginal edges of the pupillary member overlap the innermost extremities of the streaks of coloring material on the iris disk.

7. The combination called for in claim 3 including an inwardly thinning layer of translucent plastic overhanging the marginal edges of said iris above the level of the outermost extremity of the pupillary member.

8. An artificial eye in which the combination called for in claim 3 is located in a recess in the front face of an artificial eye body with the corneal member inclined away from the wall of the recess and including an inwardly thinning layer of translucent plastic overlapping the edge of the corneal member at the limbus with a feathered edge and filling the space between said side of the corneal member and the wall of the recess, and a clear conjunctiva layer covering said front face and corneal element.

9. The combination called for in claim 3 including a stem on the front wall of the corneal element coaxial with said pupillary member and aperture.

References Cited in the file of this patent

UNITED STATES PATENTS

| Number | Name | Date |
| --- | --- | --- |
| 1,253,888 | Rosser | Jan. 15, 1918 |
| 1,268,885 | Sampson | June 11, 1918 |
| 1,979,321 | Dunner | Nov. 6, 1934 |
| 2,497,872 | Erpf et al. | Feb. 21, 1950 |
| 2,551,781 | Yuhas | May 8, 1951 |

OTHER REFERENCES

Article from "Canadian Industries Limited Oval" for December 1944, by Elizabeth McKechnie, "Apt Pupils," pp. 8 and 9. (A copy is in Div. 55 of the Patent Office.)